United States Patent [19]
Berti et al.

[11] Patent Number: 5,237,040
[45] Date of Patent: Aug. 17, 1993

[54] PROCESS FOR PREPARING AROMATIC POLYESTERS

[75] Inventors: Corrado Berti, Raveena; Francesco Pilati; Virna Bonora, both of Bologna; Maurizio Fiorini, Bazzano; Italo Borghi, Ferrara; Leonardo Fiore, Milan, all of Italy

[73] Assignee: ECP ENICHEM POLIMERI S.r.l., Milan, Italy

[21] Appl. No.: 825,583

[22] Filed: Jan. 24, 1992

[30] Foreign Application Priority Data

Jan. 25, 1991 [IT] Italy .................. MI91 A 000189

[51] Int. Cl.⁵ .............. C08G 63/00; C08G 67/00; C08G 63/02
[52] U.S. Cl. ...................... 528/272; 528/196; 528/271; 528/279
[58] Field of Search .............. 528/271, 272, 279, 196

[56] References Cited

U.S. PATENT DOCUMENTS

| | | | |
|---|---|---|---|
| 3,317,464 | 5/1967 | Conix | 528/193 |
| 3,395,119 | 7/1968 | Blaschke et al. | 528/194 |
| 4,041,018 | 8/1977 | Binsack et al. | 528/272 |
| 4,966,958 | 10/1990 | Tacke et al. | 528/271 |

FOREIGN PATENT DOCUMENTS

| | | |
|---|---|---|
| 2232877 | 1/1974 | Fed. Rep. of Germany . |
| 1299248 | 12/1962 | France . |
| 773538 | 4/1954 | United Kingdom . |

*Primary Examiner*—John Kight, III
*Assistant Examiner*—T. Mosley
*Attorney, Agent, or Firm*—Oblon, Spivak, McClelland, Maier & Neustadt

[57] ABSTRACT

A process for preparing aromatic polyesters having excellent physico-mechanical and solvent-resistance properties, consisting in reacting at least a dialkyl ester of an aromatic diacid with an aromatic polycarbonate and/or an aromatic dialkyldicarbonate in the presence of an esterification or transesterification catalyst.

13 Claims, No Drawings

PROCESS FOR PREPARING AROMATIC POLYESTERS

The present invention relates to a process for preparing aromatic polyesters.

More in particular, the present invention relates to a process for preparing aromatic polyesters having excellent physico-mechanical and solvent-resistance properties.

The wholly aromatic polyesters are polymers of high technological interest due to their excellent mechanical and thermal properties.

The physico-mechanical characteristics of these polymers derive from the high number of aromatic rings contained in their macromolecule. The aromatic polyesters obtained by the process of the present invention are characterized, in fact, by an alternate sequence of aromatic groups and estereal groups.

Such products exhibit an excellent combination of properties such as for example: glass transition temperature higher than 170° C., tensile modulus higher than 2,300 MPa, flexural resistance higher than 67 MPa and excellent resistance to solvents and oils.

They are utilized in a plurality of industrial technologies such as extrusion, injection molding, spinning, film-forming, etc.

Typically, an aromatic polyester consists of a moiety deriving from an aromatic diacid and of a moiety deriving from a diphenol. It is generally known that the aromatic diacids and the diphenols do not easily react with each other and, even if that occurs, polymers having a high enough molecular weight are hardly obtained.

Due to this reason, the synthesis of an aromatic polyester comprises a first step, in which a reactive derivative of one of the two monomers is prepared, which is then polycondensed with the other monomer. According to what is reported in "Comprehensive Polymer Science" (vol. 5, page 317, 1987), three processes of major industrial interest for the synthesis of aromatic polyesters can be distinguished, depending on whether one of the two components involved in the synthesis is an acyl dichloride, or a diaryldicarboxylate or a diphenol diacetate.

The synthesis from acyl dichlorides comprises an initial chlorination of the diacid and a subsequent reaction of the dichloride with a diphenol, for example according to the interface polymerization method. This process, although it is conducted at low temperatures, requires complex operations for synthesizing and purifying the dichloride, as well as great amounts of solvent in the polymer synthesis. Furthermore, it requires complex operations for purifying the solutions of the obtained polymer and for recovering the polyester from such solutions.

The processes starting from diaryldicarboxylates or from diphenoldiacetates respectively described, for example, in U.S. Pat. Nos. 3,395,119 and 3,317,464, comprise a polycondensation in the molten state at high temperature. Both processes are based on the removal of a volatile condensation product (phenol or acetic acid) and are carried out in two steps: in the first step, the formation of oligomers occurs, while in the successive step, carried out under more drastic temperature (300–350° C.) and pressure (0.1 torr) conditions, the polymer is obtained.

The Applicant has now found a new process for preparing aromatic polyesters, in which the starting products are easily available.

According to the present invention, the process for preparing aromatic polyesters consists in reacting at least a dialkyl ester of an aromatic diacid with at least an aromatic polycarbonate and/or an aromatic dialkyldicarbonate, in the presence of an esterification or transesterification catalyst.

The process forming the object of the present invention is preferably conducted in two steps at different temperatures. In the first step, an aromatic carbonate and/or an aromatic polycarbonate is mixed with an alkyl ester of an aromatic dicarboxylic acid, and the mixture is heated to a temperature ranging from 200° to 300° C., in the presence of a transesterification catalyst.

A portion of the dialkylcarbonate formed by transesterification is distilled off.

In the second step, the temperature is raised up to 280°–350° C. and the remaining portion of dialkylcarbonate is removed under vacuum (0.05–0.5 torr), giving rise to the formation of a high molecular weight aromatic polyester.

During the synthesis process, the following transesterification reactions between the ester and carbonate groups take place:

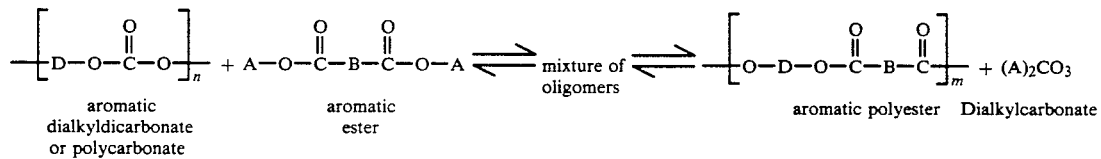

where n is at least 2 and up to 500 in the case of an oligomer or polycarbonate polymer, m ranges from 50 to 500, D is the aromatic residue of a diphenol and A and B are defined later on herein.

As it is known for all the transesterification reactions, also during the process of the present invention the reactive system tends to the equilibrium, which is shifted towards the quantitative formation of the high molecular weight aromatic polyester by removal of the dialkylcarbonate.

Any aromatic polycarbonate known from the art can be utilized either alone or in admixture with other polycarbonates in the process of the present invention.

As polycarbonates it is possible to use, in particular, the polymers or copolymers corresponding to the following general formula:

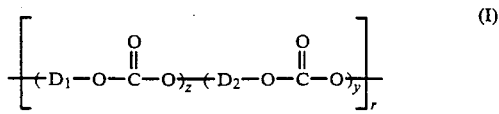

(I)

where z and y can range from 1 to 500, r can be any integer higher than 0, provided that (ry+rz) is lower than 500, $D_1$ and $D_2$, alike or different from each other, represent an aromatic residue of a diphenol.

Examples of aromatic residues D, $D_1$ or $D_2$ comprise ortho-, meta-, para-phenylene, diphenylene, 2,6-naphthalene, 2,8-naphthalene, 1,5-naphthalene, 1,4-naphthalene, or:

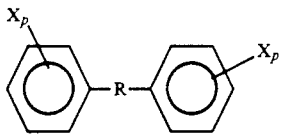

wherein: each X, independent of one another, can be either a halogen such as F, Cl, Br, or also a $C_1$-$C_6$ alkyl, and p is 0 or an integer ranging from 1 to 4;

R is: O, $SO_2$, S,

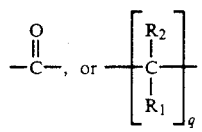

wherein:

$R_1$ and $R_2$, alike or different from each other, can be H or a $C_1$-$C_4$ alkyl, and q is 1 to 6.

Among the polycarbonates, which are utilizable for the invention, the preferred ones are those based on bisphenol A, examples of which are the products marketed under the trademark LEXAN of General Electric Company, MAKROLON of Bayer or SINVET of Montedipe.

By "aromatic dialkyldicarbonates", whenever used in the present specification and in the claims, are meant the ones having general formula:

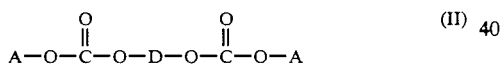
(II)

wherein D is the same as defined hereinbefore and A can be a $C_1$-$C_4$-alkyl.

Any aromatic diacid having all the carboxylic groups esterified with aliphatic alkyl radicals can be used in the process of the present invention.

In particular, dialkyldicarboxylates utilizable in the present invention can be all the derivatives, taken individually or in admixture, of aromatic dicarboxylic acids having the following general formula:

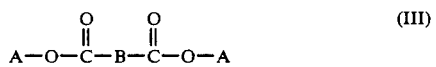
(III)

where A is a $C_1$-$C_4$-alkyl and B can be m-, o- or p-phenylene, 2,6-naphthalene, 2,8-naphthalene, 1,5-naphthalene, 1-4-naphthalene, oxydiphenylene, diphenylene and the like.

Among the dialkyldicarboxylates there are preferred the derivatives of the isophthalic or terephthalic acids either individually or in admixture with each other.

The catalyst utilizable in the process of the present invention are the ones which are known for the esterification or transesterification processes such as, for example, Ti or Zr tetraalkoxides and preferably titanium tetraisopropoxide or tetra-n-butoxide.

The catalyst can be added to the reaction mixture in amounts ranging from 0.1% to 5.0% and preferably from 0.5% to 3% by weight calculated on the aromatic polycarbonate and/or dialkyldicarbonate introduced at the beginning of the process.

In the process of the present invention, the polycarbonate (or the corresponding aromatic dialkyldicarbonate, or the oligomeric polycarbonate, or a mixture thereof) can be fed in admixture with the diester of the aromatic diacid or separately from it.

The ratios between the two components are referred to the molar ratio between the respective aromatic residues (diphenol and diacid). The two components can be fed in the stoichiometric ratio to each other (molar ratio=1) or, preferably, with an excess of dialkylester of the aromatic diacid variable from 0 to 100% and, still more preferably, with an excess from 10% to 50%.

If an excess of dialkyldicarboxylate is used, the unreacted portion will be distilled under high vacuum in the last steps of the process.

The first step of the process of the present invention is conducted at temperatures from 200° to 300° C., and preferably from 260° to 290° C.

The second step of the process can be conducted at temperatures ranging from 280° to 350° C. under progressive reduction of the pressure to values lower than or equal to 0.5 torr.

The aromatic polyesters obtained by means of the process of the present invention are characterized by the inherent viscosity, which is a function of the molecular weight. The measurement is made in phenol/tetrachloroethane (60/40 by wg.) or chloroform solutions, containing 0.5 g/dl of polymer, at 30° C.

The aromatic polyester structure is confirmed by IR and $^1$HNMR spectroscopy according to the methodologies known to those skilled in the art.

The following examples are given to illustrate the present invention, but they are by no way to be considered as a limitation of the claims.

EXAMPLE 1

244 g of poly(4,4'-isopropylidene diphenylene carbonate), 268 g of dimethyl terephthalate and 1.14 g of catalyst Ti(OBu)$_4$ were introduced into a stainless steel polymerization reactor equipped with a distillation column and with two condensers respectively cooled with running water and with liquid nitrogen.

The reaction mixture was heated under stirring and in a nitrogen atmosphere up to 280° C. and was maintained for 60 minutes at such temperature.

The dimethylcarbonate distillation was then started, and 47 ml of dimethylcarbonate were collected in 120 minutes. On conclusion of the distillation, the reactor inside temperature was brought up to 298° C.

Vacuum (0.4 torr) was generated and the temperature was brought to 310° C. The removal of all the volatile products was then carried on for 30 minutes, gradually increasing the temperature up to 340° C. in 30 minutes.

Polymerization was stopped and the polymer which had formed was collected and characterized. The obtained polymer was composed of poly(4,4'-isopropylidene diphenylether terephthalate) having an inherent viscosity of 0.96 dl/g in phenol/tetrachloroethane.

EXAMPLE 2

An aromatic polyester was obtained by operating under analogous conditions and for the same times as is described in example 1, but introducing into the reactor 244 g of poly(4,4'-isopropylidene diphenylene carbonate), 134 g of dimethyl terephthalate, 134 g of dimethylisophthalate and 1.34 of catalyst [Ti(OBu)4].

In the first reaction step, 26 ml of dimethylcarbonate were collected.

The product obtained on conclusion of the reaction consisted of a statistic polymer of poly(4,4'-isopropylidene diphenylene isophthalate) and poly(4,4'-isopropylidene diphenylene terephthalate), having an inherent viscosity of 0.96 dl/g in chloroform.

EXAMPLE 3

Into a flask there were introduced 1,076 g of 4,4'-isopropylidene diphenylene dimethyldicarbonate, 0.675 g of terephthalic acid dimethyl ester and 0.03 g of catalyst Ti(OBu)4.

The mixture was then heated under stirring and in an inert atmosphere, gradually raising the temperature up to 280° C. and maintaining it at 280° C. for 50 minutes. 300 mg of dimethylcarbonate were distilled. Vacuum (0.1 torr) was then generated and the temperature was brought to 300° C. and maintained for 60 minutes.

After this time, the polymer which had formed was collected and characterized; it resulted to be composed of poly (4,4'-isopropylidene diphenylene terephthalate) having an inherent viscosity of 0.90 dl/g in phenol/tetrachloroethane.

We claim:

1. A process for preparing an aromatic polyester, comprising reacting at least one dialkyl ester of an aromatic diacid with at least one polycarbonate, aromatic dialkyldicarbonate having the following formula:

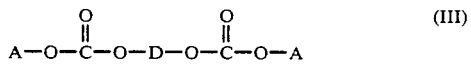

where D is an aromatic radical of a diphenol and A is a $C_1$-$C_4$ alkyl, or mixture thereof in the presence of an esterification catalyst or transesterification catalyst.

2. The process according to claim 1, wherein the reaction is first conducted at 200-300° C. and then conducted at 280-350° C., under vacuum.

3. The process according to claim 1, wherein the polycarbonate has the following formula:

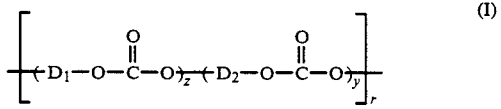

where z and y are the same or different and are integers from 1 to 500, r is an integer greater than 0 provided that (ry+rz) is less than 500, and $D_1$ and $D_2$ are the same or different and are aromatic radicals of a diphenol.

4. The process according to claim 1 or 3, wherein the phenolic radicals D, $D_1$ and $D_2$ are selected from the group consisting of derivatives of othrophenylene, metaphenylene, paraphenylene, diphenylene, 2,6-naphthalene, 2,8-naphthalene, 1,5-naphthalene, 1,4-naphthalene, and

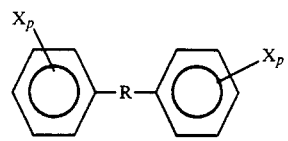

where each X is the same or different from any other X and is F, Cl, Br, or a $C_1$-$C_6$ alkyl; p is 0 or an integer from 1 to 4; and R is O, $SO_2$, S,

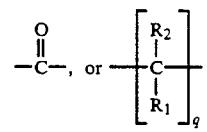

where $R_1$ and $R_2$ are the same or different and are H or a $C_1$-$C_4$ alkyl, and q is an integer from 1 to 6.

5. The process according to claim 4, wherein D, $D_1$ or $D_2$ is an aromatic radical of bisphenol-A.

6. The process according to claim 1, wherein the dialkyl ester of an aromatic diacid is a dialkyldicarboxylate having the following formula:

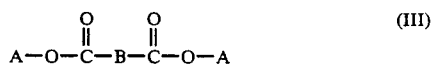

where A is a $C_1$-$C_4$ alkyl and B is selected from the group consisting of derivatives of metaphenylene, orthophenylene, paraphenylene, 2,6-naphthalene, 2,8-naphthalene, 1,5-naphthalene, 1,4-naphthalene, oxydiphenylene and diphenylene.

7. The process according to claim 6, wherein the dialkyldicarboxylate is a derivative of isophthalic acid or terephthalic acid.

8. The process according to claim 1, wherein the esterification catalyst or transesterification catalyst is titanium tetraalkoxide or zirconium tetraalkoxide.

9. The process according to claim 8, wherein the esterification catalyst or transesterification catalyst is titanium tetraisopropoxide or titanium tetra-n-butoxide.

10. The process according to claim 8, wherein the titanium tetraalkoxide or zirconium tetraalkoxide is present in an amount from 0.1 to 5.0% by weight based on the weight of polycarbonate, aromatic dialkyldicarbonate, or mixture thereof.

11. The process according to claim 1, wherein the aromatic diacid dialkyl ester is present in a stoichiometric excess of up to 100% based on the amount of polycarbonate, aromatic dialkyldicarbonate, or mixture thereof.

12. The process according to claim 11, wherein the aromatic diacid dialkyl ester is present in a stoichiometric access of 10 to 50% based on the amount of polycarbonate, aromatic dialkyldicarbonate, or mixture thereof.

13. An aromatic polyester having the following formula:

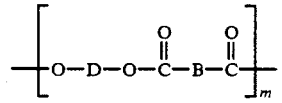

where m is an integer from 50 to 500, D is an aromatic radical of a diphenol, and B is selected from the group consisting of derivatives of metaphenylene, orthophenylene, paraphenylene, 2,6-naphthalene, 2,8-naphthalene, 1,5-naphthalene, 1,4-naphthalene, oxydiphenylene and diphenylene.

* * * * *